(12) United States Patent
Ervin

(10) Patent No.: US 11,964,893 B2
(45) Date of Patent: Apr. 23, 2024

(54) BIOPOLYMERIC WATER TREATMENT

(71) Applicant: AquOm Sciences LLC, Lakeland, FL (US)

(72) Inventor: Keith Ervin, Lakeland, FL (US)

(73) Assignee: Keith Ervin, Hollister, MO (US)

( * ) Notice: Subject to any disclaimer, the term of this patent is extended or adjusted under 35 U.S.C. 154(b) by 0 days.

(21) Appl. No.: 18/164,194

(22) Filed: Feb. 3, 2023

(65) Prior Publication Data

US 2023/0183116 A1    Jun. 15, 2023

Related U.S. Application Data

(63) Continuation of application No. 16/630,163, filed as application No. PCT/US2018/041843 on Jul. 12, 2018, now Pat. No. 11,572,297.

(Continued)

(51) Int. Cl.
*C02F 9/00* (2023.01)
*B01J 20/04* (2006.01)
(Continued)

(52) U.S. Cl.
CPC .............. *C02F 9/00* (2013.01); *B01J 20/043* (2013.01); *B01J 20/12* (2013.01); *B01J 20/14* (2013.01); *B01J 20/165* (2013.01); *B01J 20/20* (2013.01); *B01J 20/28004* (2013.01); *C02F 1/281* (2013.01); *C02F 1/283* (2013.01); *C02F 1/32* (2013.01); *C02F 1/50* (2013.01); *C02F 1/5263* (2013.01); *C02F 1/56* (2013.01); *C02F 2101/006* (2013.01); *C02F 2101/20* (2013.01); *C02F 2101/306* (2013.01);
(Continued)

(58) Field of Classification Search
None
See application file for complete search history.

(56) References Cited

U.S. PATENT DOCUMENTS

| | | | |
|---|---|---|---|
| 4,401,574 A * | 8/1983 | Farrington | C01F 7/57 |
| | | | 210/930 |
| 4,570,629 A * | 2/1986 | Widra | C08L 5/08 |
| | | | 602/50 |

(Continued)

FOREIGN PATENT DOCUMENTS

| | | |
|---|---|---|
| CN | 106335961 | 1/2017 |
| WO | 2015200206 | 12/2015 |

OTHER PUBLICATIONS

Katiyar, Deepmala, et al. "A Future Perspective in Crop Protection: Chitosan and its Oligosaccharides," Adv Plants Agric Res 2014, 1(1):00006.

(Continued)

*Primary Examiner* — Chester T Barry
(74) *Attorney, Agent, or Firm* — Andrus Intellectual Property Law, LLP

(57) ABSTRACT

A method of water treatment includes providing water that includes at least one contaminant. An effective amount of at least one filter media is added to the to the water that includes at least one contaminant. The water and the at least one filter media are agitated to form a homogeneous mixture. A cationic biopolymer is added to the homogeneous mixture of water and the at least one filter media. The water is separated from the at least one contaminant and the at least one filter media.

21 Claims, 2 Drawing Sheets

Related U.S. Application Data

(60) Provisional application No. 62/532,727, filed on Jul. 14, 2017.

(51) Int. Cl.
| | | |
|---|---|---|
| *B01J 20/12* | (2006.01) | |
| *B01J 20/14* | (2006.01) | |
| *B01J 20/16* | (2006.01) | |
| *B01J 20/20* | (2006.01) | |
| *B01J 20/28* | (2006.01) | |
| *C02F 1/28* | (2023.01) | |
| *C02F 1/32* | (2023.01) | |
| *C02F 1/50* | (2023.01) | |
| *C02F 1/52* | (2023.01) | |
| *C02F 1/56* | (2023.01) | |
| *C02F 101/00* | (2006.01) | |
| *C02F 101/20* | (2006.01) | |
| *C02F 101/30* | (2006.01) | |
| *C02F 101/32* | (2006.01) | |

(52) U.S. Cl.
CPC ..... *C02F 2101/322* (2013.01); *C02F 2209/11* (2013.01); *C02F 2303/04* (2013.01)

(56) References Cited

U.S. PATENT DOCUMENTS

| | | | |
|---|---|---|---|
| 5,071,587 A | 12/1991 | Perman | |
| 5,543,056 A * | 8/1996 | Murcott | C02F 1/56 210/705 |
| 5,569,385 A * | 10/1996 | O'Carroll | C02F 1/56 210/730 |
| 5,670,435 A | 9/1997 | Kajita | |
| 6,110,374 A * | 8/2000 | Hughes | C02F 1/5236 210/702 |
| 6,132,625 A | 10/2000 | Moffett | |
| 6,217,765 B1 | 4/2001 | Yamasaki et al. | |
| 7,855,310 B2 | 12/2010 | Herrmann et al. | |
| 2003/0045692 A1 * | 3/2003 | Sannan | C08B 37/003 536/20 |
| 2004/0217326 A1 * | 11/2004 | Souter | C02F 1/56 252/179 |
| 2007/0262026 A1 | 11/2007 | Cuero et al. | |
| 2009/0178980 A1 | 7/2009 | Newcombe | |
| 2010/0176044 A1 * | 7/2010 | Domb | B01J 20/103 210/287 |
| 2010/0237009 A1 | 9/2010 | Horst | |
| 2011/0147316 A1 | 6/2011 | Polizzotti et al. | |
| 2012/0211426 A1 | 8/2012 | Santoro et al. | |
| 2013/0220937 A1 | 8/2013 | Capeau et al. | |
| 2014/0124454 A1 | 5/2014 | Nichols et al. | |
| 2015/0144564 A1 | 5/2015 | Moller et al. | |
| 2015/0166383 A1 | 6/2015 | Visnja et al. | |
| 2016/0145133 A1 | 5/2016 | Roberts et al. | |
| 2016/0145807 A1 * | 5/2016 | Aarni | D21H 21/16 106/447 |
| 2016/0251244 A1 | 9/2016 | Cwiertny et al. | |
| 2016/0318785 A1 | 11/2016 | Enslow | |
| 2019/0152813 A1 * | 5/2019 | Rytwo | B01D 21/01 |
| 2020/0231483 A1 | 7/2020 | Ervin | |

OTHER PUBLICATIONS

Doares, Steven H., et al. "Oligogalacturonides and chitosan activate plant defensive genes through the octadecanoid pathway," Proc. Natl. Acad. Sci. USA vol. 92, pp. 4095-4098, May 1995 Colloquium Paper.
Malerba, Massimo, et al. "Chitosan Effects on Plant Systems," Int. J. Mol. Sci. 2016, 17, 996.
Office Action for European Patent Application No. 18831364.7, dated Dec. 7, 2021.
Extended European Search Report corresponding to European Patent Application No. 18831364.7, dated Dec. 3, 2020.
International Search Report and Written Opinion for International Application PCT/US2018/041843, dated Oct. 1, 2018.
Haycarb, "Activated Carbon |What Is Activated Carbon|Benefits", published Jun. 10, 2017, retrieved from https://web.archive.org/web/20170601002721/http://www.haycarb.com/activated-carbon.

* cited by examiner

BIOPOLYMERIC WATER TREATMENT

CROSS REFERENCE TO RELATED APPLICATIONS

This application is a continuation of application Ser. No. 16/630,163 filed on Jan. 10, 2020, now U.S. Pat. No. 11,572,297, which is the U.S. National Stage application of International Application PCT/US2018/041843, filed Jul. 12, 2018, which international application was published on Jan. 17, 2019, as International Publication WO2019/014459 in the English language. The international application is incorporated herein by reference, in its entirety. The international application claims priority to U.S. Provisional Patent Application No. 62/532,727, filed Jul. 14, 2017, which is incorporated herein by reference in its entirety.

BACKGROUND

The present disclosure is related to the field of water processing and purification. More specifically, the present disclosure is related to the purification of water using polymer additives.

Water may be contaminated with numerous substances considered harmful to human or other life. Microorganisms for example from wastewater, can spread disease among humans. While often a secondary effect of nitrate and/or phosphate contamination algae and other aquatic plants can be another source of contamination. Algae can produce toxins which leach into the water. Furthermore, dead algae and aquatic plans provide a ready food source to other microorganisms and bacteria which are harmful to humans. Pharmaceuticals or hormones can harm biological processes. Minerals and chemicals with harmful cumulative effects can naturally occur or may be present in water distribution systems.

Many industrial or resource extraction operations produce contaminated water. These operations may contaminate water with heavy metals, volatile organic compounds (VOCS), polychlorinated biphenyls ($BCB_s$), pharmaceuticals, pesticides, radionuclides, and harmful microorganisms. These and other contaminants must be removed before the water is discharged or it risks contaminating the environment or freshwater resources.

Being a well known source of harmful microorganisms, water is often treated prior to human consumption. Often drinking water is treated with harsh chemicals in order to eliminate harmful microorganisms that can cause health problems in humans and/or pets. There is growing public concern and caution regarding impact on human health from ingesting the chemicals used to treat water. There are similar concerns regarding the impact of the use of these chemicals on the quality of our natural environment.

BRIEF DISCLOSURE

An exemplary embodiment of a method of water treatment includes providing water that includes at least one contaminant. An effective amount of at least one filter media is added to the to the water that includes at least one contaminant. The water and the at least one filter media are agitated to form a homogeneous mixture. A cationic biopolymer is added to the homogeneous mixture of water and the at least one filter media. The water is separated from the at least one contaminant and the at least one filter media.

In further exemplary embodiments of the method, at least one contaminant is adsorbed from the water that includes at least one contaminant onto the filter media. The at least one filter media and the at least one contaminant are coagulated with the cationic biopolymer. The water is separated from the at least one contaminant and the at least one filter media by mechanical separation. The water is separated from the cationic biopolymer at the same time that the water is separated from the at least one contaminant and the at least one filter media.

In exemplary embodiments of the method, the filter media includes at least two of: carbon, aragonite, bentonite, zeolite and diatomite. The method may include determining a chemical content of the at least one contaminant in the water. The method may further include selecting the at least one filter media based upon the determined chemical content. In embodiments, a turbidity of the water may be measured. The effective amount of the at least one filter media may be determined from the measured turbidity of the water. The effective amount of the cationic biopolymer may be determined from a measured turbidity of the water after the addition of the at least one filter media.

In additional exemplary embodiments, the cationic biopolymer is added to the water as a cationic biopolymer solution. The cationic biopolymer may include chitosan or a chitosan derivative. The chitosan derivative may be selected from chitosan citrate, chitosan oligosaccharide, chitosan acetate, chitosan malate, and chitosan formate.

In further exemplary embodiments of the method, the water separated from the at least one contaminant and the at least one filter media is filtered after separation. The water separated from the at least one contaminant and the at least one filter media may be treated with UV light after separation. The removed at least one contaminant and the at least one filter media may be collected for use as a fertilizer.

In exemplary embodiments, the at least one contaminant is a first contaminant and the at least one filter media is a first filter media. An effective amount of a second filter media is added to the water separated from the first contaminant and the first filter media. The water and the second filter media are agitated to form a homogeneous mixture. Chitosan or a chitosan derivative is added to the homogeneous mixture of water and the at second filter media. The water is separated from a second contaminant and the second filter media. The second contaminant may be adsorbed from the water onto the second filter media. The second filter media and the second contaminant may be coagulated with the chitosan or the chitosan derivative.

In still further exemplary embodiments of the method, filter media has an average particle size less than one millimeter. The filter media may have an average particle size less than 100 micrometers. The filter media may include a geopolymer.

DETAILED DISCLOSURE

Figure 1:
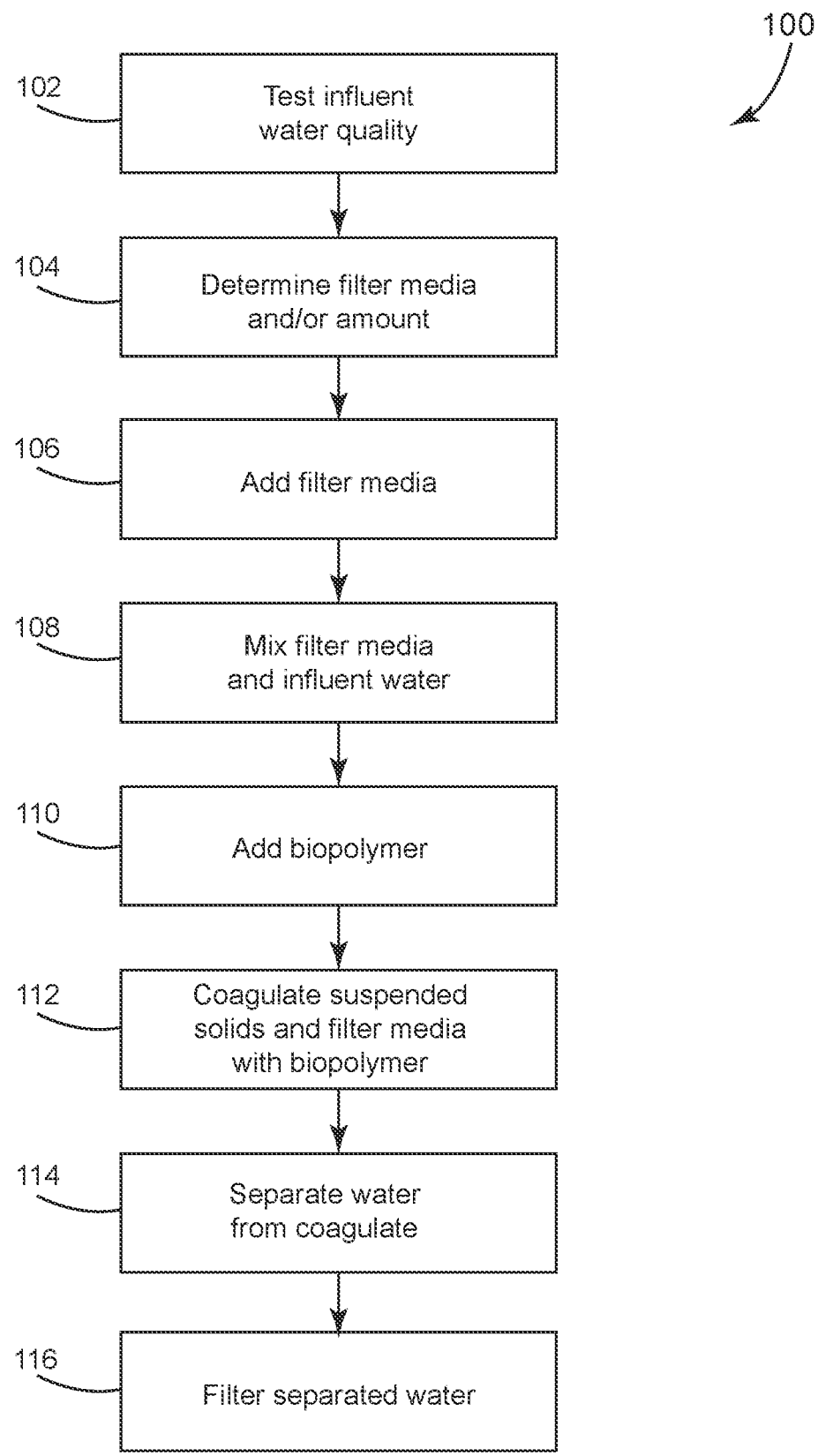
FIG. 1 is a flow chart that depicts an exemplary embodiment of a method of water treatment using biopolymers.

The present disclosure relates to the treatment of water using biopolymer additives to purify the water from plant, bacteria, viruses, and other microorganism contaminants. The present disclosure also relates to systems and processes of water treatment for not only plant, bacteria, and other microorganism contaminants, but to remove other contaminants including, but not limited to: dissolved solids, suspended solids, heavy metals, volatile organic compounds (VOC's), radionuclides, pesticides, and pharmaceuticals.

Embodiments as disclosed herein incorporate the addition of a biopolymer, or a biopolymeric mixture in the water treatment process. The biopolymer of chitosan will be used herein in its exemplary capacity, although it will be recognized that other biopolymers having similar properties may be suitable for use in other embodiments.

Chitosan is an abundant biopolymer consisting of randomly distributed beta (1→4)-linked D-Glucosamine (deacetylated unit) and N-acetyl-D-Glucosamine (acetylated unit) obtained by the partial deacetylation of chitin. Chitin is found mainly in the exoskeletons of crustaceans and insects, as well as in fungi (e.g. mushrooms and yeasts). At the present time, chitin obtained from shellfish shells stands as the most sustainable and abundant source of chitin in the world, therefore the most abundant and sustainable source of chitosan in the world. Chitin is the second most abundant biopolymer in the world. While chitin is abundant, much of it is discarded as waste from the harvesting or removal of shellfish for industrial, commercial, or consumption purposes.

In embodiments, chitosan and/or chitosan derivatives with or without further materials may be added into a water treatment process as a natural herbicide and pesticide, and to promote efficiency in the water treatment process. Chitosan and chitosan oligosaccharide derivatives can kill harmful bacteria, fungus, fungus gnats, botrytis, thrips, syllids, white flies, citrus greening disease, aphids, nematodes, etc. While exhibiting these anti-microbial properties, chitosan and chitosan oligosaccharide are biocompatabile, biodegradable, and hypo allergenic. See Further Katiyar, Deepmala, et al. "A Future Perspective in Crop Protection: Chitosan and its Oligosaccharides," Adv Plants Agric Res 2014, 1(1):00006; Doares, Steven H., et al. "Oligogalacturonides and chitosan activate plant defensive genes through the octadecanoid pathway," Proc. Natl. Acad. Sci. USA Vol. 92, pp. 4095-4098, May 1995 Colloquium Paper; and Malerba, Massimo, et al. "Chitosan Effects on Plant Systems," Int. J. Mol. Sci. 2016, 17, 996, all of which are hereby incorporated by reference herein in their entireties.

While the exemplary embodiment of chitosan is used herein, it will be recognized that other biopolymers may also be used in further embodiments within the present disclosure. Chitosan has a property of being a coagulant for suspended particles in water. This effect can be further leveraged in a water treatment process to improve water clarity and removal of accumulated contaminants.

Embodiments of the invention as described herein include a variety of processes by which a biopolymer, and exemplarily a cationic biopolymer (e.g. chitosan or chitosan derivative) is used to treat water to improve the water quality and elevate the available uses for that water. Other embodiments as described herein provide processes by which useful byproducts of such water treatment are isolated for reuse.

In exemplary embodiments, a cationic biopolymer alone or in combination with one or more derivatives of that biopolymer (e.g. chitosan oligosaccharide) is mixed into water for treatment. The combination of chitosan and chitosan oligosaccharide provides a fuller spectrum of antimicrobial effect. Chitosan and chitosan oligosaccharide have different but partially overlapping anti-microbial effects, therefore combination of these two substances provides a complementary effect.

In embodiments, the cationic biopolymer, and any derivatives thereof, are used in a process of water treatment in combination with another filter media. In a first exemplary embodiment, liquid chitosan is used in combination with at least one additional water filter media to treat water. In such an embodiment, the combination of biopolymer, biopolymer derivative, and filter media is used in a moving bed bio reactor water treatment system. In-situ or batch/retort treatment systems may also implement the processes described herein. The filter media used may include but is not limited to: calcium, bentonite, perlite, activated alumina, redox alloys, activated carbon, diatomite, aragonite, zeolite, attapulgite and ion exchange resins. In exemplary embodiments, the filter media is a geopolymer. A combination of one or more of the above filter media may be selected based upon the known contaminants in the water to be treated. Exemplary embodiments, include but are not limited to: carbon for VOC's or Pharmaceuticals; zeolite for Phosphates, Nitrates, VOC's, heavy metals, or oils; activated alumina/redox to raise dissolved oxygen levels and remove metals and VOC's; aragonite to selective phosphate removal or antimicrobial purposes; calcium or magnesium to additionally increase pH; diatomite (diatomaceous earth) for clarification or antimicrobial properties; bentonite or clay for solids, heavy metals or oils.

While the disclosure provided herein is not so limited, exemplary embodiments are provided that use a combination of a biopolymer and a geopolymer media. In more specific embodiments, the biopolymer is chitosan. Geopolymers are inorganic materials that form covalently bonded amorphous structures. Geopolymers include, but are not limited to silicate, aluminosilicate, phosphosilicate, ferrosilicate materials. Geopolymers can occur naturally or can be manufactured, manufactured geopolymers can also include calcium, fly ash, or organic mineral based geopolymers and others. The addition of chitosan to these geopolymer media produce further a coagulation and flocculation effect when used in a moving bed water treatment system. The concentrations, amounts, and specific variety of biopolymers (e.g. chitosan/chitosan oligosaccharide/chitosan citrate) may be varied based upon the geopolymer media used and the specific contaminants targeted during the process.

In use, the combined filter media and biopolymer treatment substance is mixed into the untreated water stored exemplarily in a water treatment reservoir, bioreactor, retort or similar. During the mixing process, the micronized filter media acts as molecular sieves and, in embodiments, ion exchange particles form chemical and mechanical bonds with a spectrum of contaminants while the chitosan promotes the flocculation, coagulation, and separation of the contaminants from the water. Rather than using pressure like reverse osmosis, which can require significant energy expenditure, this process may instead use the repeated localized expansion and contraction pressures of mixing/stirring/mechanical agitation to ensure maximum exposure/absorption/adsorption/ion exchange to/with the pores/receptor sites of the filter media, which contains the chitosan.

In another exemplary embodiment, multiple stages of water treatment are provided with filter media and biopolymer combinations. In a multi stage process, solids/turbidity can be removed selectively, heavy metals/dissolved metals, VOC's, Pharmaceuticals, microorganisms, nutrients, etc. by a predetermined order of filter media treatments in funnel like manner in order to achieve specific or broad spectrum reduction of contaminants. In an exemplary embodiment of the selective multi stage process each stage uses a different biopolymer media (e.g. clay, silicate, etc.) and chitosan polymer combination to remove the contaminants and flocculate by the media and further coagulate the contaminants for sequestration and removal. This multi-stage process may be implemented as a batch process or as an inline process.

As described herein, further examples of water treatment processes sequentially treat the water with filter media and then add the biopolymer to further treat the water, but to also coagulate and facilitate removal of the filter media entrained in the water to form a potentially usable by-product as described in further detail herein, and to clear the filter media from one stage from the water before the addition of a subsequent filter media or other water treatment processes.

Figure 2:
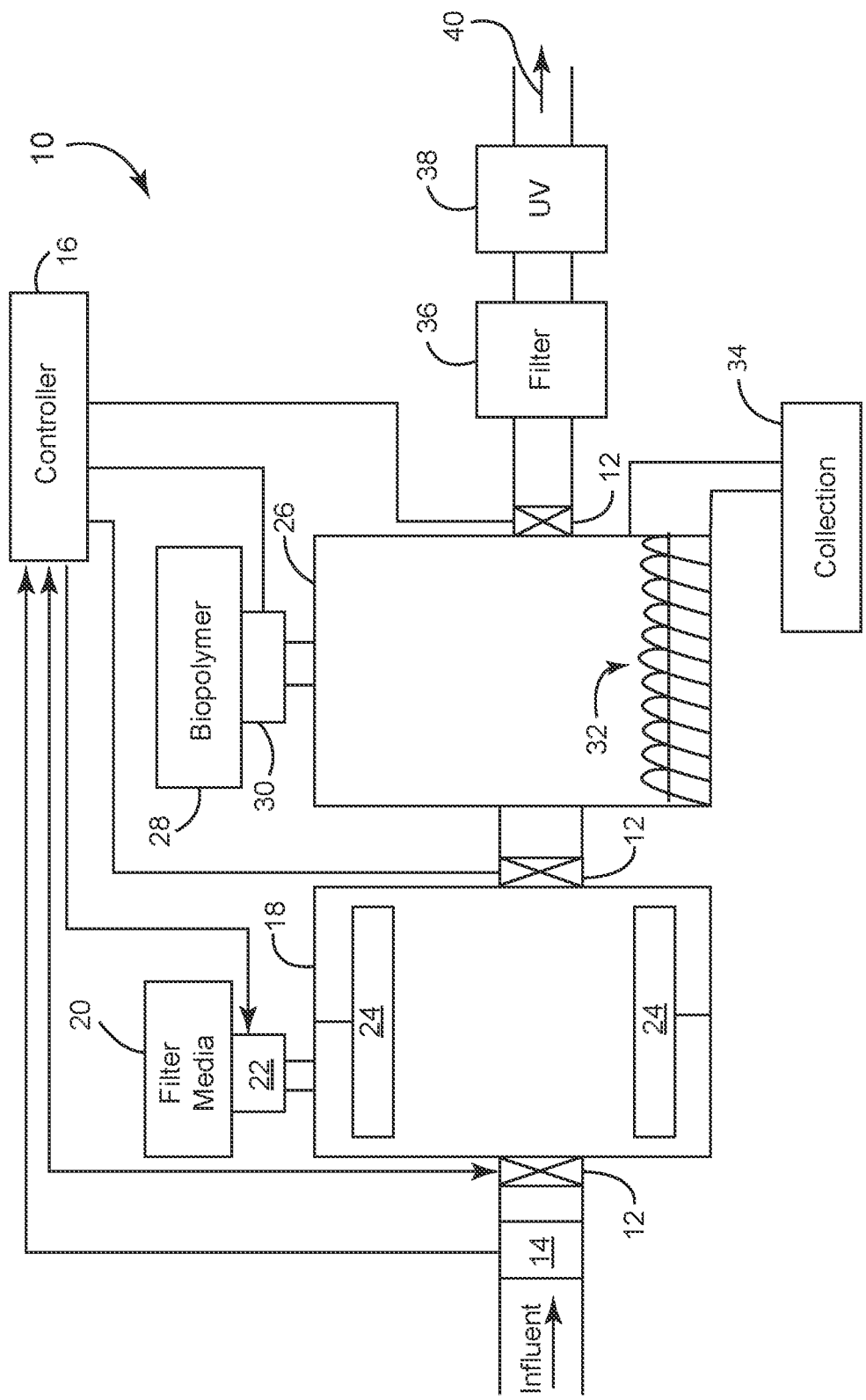
FIG. 2 is a system diagram of an exemplary embodiment of a water treatment system.

FIG. 1 is a flow chart that depicts an exemplary embodiment of a method 100 of water treatment using biopolymers. FIG. 2 is a system diagram of an exemplary embodiment of a water treatment system 10. An embodiment of the water treatment system 10 may operate to carry out an embodiment of the method 100. The water treatment system 10 is exemplarily depicted in a generalized form whereby water may be treated in an inline or in a batch processing manner, for example by changing the dimensions of the components and by operation of valves 12 between the stages. While not depicted in still further embodiments, gravity feed or pumps between the stages may be used to move the water between stages in a batch treatment process.

At 102, the influent water quality is tested. In an exemplary embodiment this is performed using a turbidity sensor 14. Exemplarily a turbidity sensor may include a light source and a measurement of the scattered and/or received light at a light sensor. This information is provided to a controller 16. Turbidity is caused by particles suspended or dissolved in water that scatter light making the water appear cloudy or murky. Sediment, organic and inorganic matter, organic compounds, algae, and microscopic organisms are all causes of turbidity. It will be recognized that in other embodiments other or additional water quality measurements may be taken and used by the controller 16 as described herein. The turbidity may exemplarily be measured in the Nephlelometric Turbidity Unit (NTU).

The controller 16 is exemplarily a microcontroller and/or a processor that is communicatively connected and/or integrated to a computer readable medium upon which computer readable code in the form of software or firmware is stored. The microcontroller/processor executes the computer readable code and operates to carry out the processing and control functions as described in further detail herein. In a batch processing system or method, the controller 16 may provide control signals to one or more valves 12 to maintain the selective flow of water through the processing stages of the system 10. In embodiments, the controller may have predetermined durations of time between operations of valves 12 in the system 10, or the open and/or closed durations may be dependent upon the operation of other components of the system 10 as the system 10 operates to process water as disclosed herein.

The controller 16 operates to determine at 104 at least one filter media and/or an amount of filter media to be added to the influent water. The filter media and/or filter media amount is determined based upon the water turbidity and/or other measurement of water quality. It will be recognized that additional water quality or chemical content measurements (and the associated sensors) may be incorporated into the initial water quality testing and the results provided to the controller 16. Such measurements may identify particular chemicals for removal, for example, phosphorous or nitrogen; other measurements may identify a class of compound for removal, for example VOC's or hydrocarbons; while still other measurements may identify biological, for example algae or bacterial loads for removal. The information from these sensors to the controller 16, can enable the controller to determine the types and/or amount of filter media to use to treat the water in this stage of the process. The filter media and/or filter media amount may be further determined based upon a desired quality of the output effluent. In an exemplary embodiment, this occurs in a first stage which may be embodied in a first mixing chamber 18. The first mixing chamber 18 may be open at either end in an inline treatment system or may be selectively filled, closed, and drained by operation of associated valves 12.

Depending on the influent water quality, a specific blend of natural media (made to address/reduce specific contaminants and levels) is introduced/injected into the influent line or vessel in which contaminated water is passing or filling. The filter media may be micronized or otherwise in the form of a fine powder. In an exemplary embodiment, the filter media average particle size is less than 1 mm, while in other embodiments the filter media average particle size is less than 100 µm, and in still further embodiments the filter media average particle size is less than 1 µm. In embodiments, the filter media is a geopolymer. In exemplary embodiments, particular filter media may be preferentially suited for removal of some contaminants rather than others. In one embodiment, carbon powder, activated alumina, redox alloys may be used to remove VOC's, pharmaceuticals, pesticides, heavy metals, etc. In another exemplary embodiment aragonite, pyrrhotite, and/or zeolite may be used to remove phosphates and nitrates.

The filter media may be premixed (if a blend of media) and provided in a supply hopper 20. While not depicted, multiple supply hoppers may be provided with various filter media and the controller 16 determines an amount and a type from the available filter media types to add to the influent water. In an exemplary embodiment, the amount of the filter media is determined from the turbidity of the water and/or from another measurement from the testing of the water. The amount and type of media used in this stage is exemplarily dependent upon the level and type of contaminants present. The filter media is added at 106, exemplarily by operation of a mechanical feeder 22. The mechanical feeder may include, but is not limited to a pump, a conveyor, a measured dosing apparatus, or a partition for gravity feed thereof. In another embodiment, the filter media is entrained in water and injected by pumping through a pipe or hose. The filter media is thereby introduced into influent water in the first mixing chamber 18.

In an inline system, the flow of the influent water in combination with obstructions and/or baffles to promote circulation may be sufficient to mix the filter media and influent water. In a batch system (or an inline system) further mechanical mixing or agitation is needed to mix the filter media and influent water at 108. A mixer 24 is provided in the first chamber 18 to mix the filter media and the influent water. Mechanical mixing or agitation may be performed using paddles, pumps, impellors, stirrers, or the like. Mixing may additionally be performed in other manners, including vibratory or ultrasonically. While embodiments may achieve mixing in a variety of ways, in one preferred embodiment, the media is mixed with the water inside the vessel/chamber in a counterclockwise rotation that initiates cavitation and implosion created by paddles/pumps/impellors, etc. This rapid mixing (preferably counterclockwise) allows the media to be evenly dispersed within the volume of water to be treated. The hydrological mechanics of cavitation and implosion/repeated expansion and contraction allows for maximum contact and pressure of the media to the water molecules. This maximizes the absorption, adsorption, and ion exchange capacity of the media within the water being treated. The process as provided herein therefore uses filter media that moves and is circulated freely through the water rather than using a membrane or stationary bed of granular or ion exchange resin through which the water is moved.

Once the water and filter media is mixed to a homogenous mixture of suspended solids comprised of contaminants, contaminant laden media, and water within the chamber 18. In an embodiment, the homogeneous mixture is provided from a first processing stage to a second processing stage, exemplarily by operation of a valve 12 to provide the homogeneous mixture to a second chamber 26. However, it will be recognized that other embodiments may be implemented with only one chamber, to which the cationic biopolymer is added. At this time, the biopolymer, which may be chitosan or a chitosan derivative (e.g. chitosan oligosaccharide) is added at 110 from a reservoir 28 to the homogeneous mixture in the second chamber 26, for example by operation of a feeder 30, which may be a pump or other mechanical feeder. While in some embodiments, the chitosan or chitosan derivative may be added as a dry volume, in other embodiments, the chitosan or chitosan derivative is added as a chitosan solution. In embodiments, this has been found to promote faster mixing and coagulative effect.

As noted above, an amount of the chitosan or chitosan derivative needed for the treatment process may be determined by the controller. Examples of cationic biopolymers that may be used in embodiments include, but are not limited to chitosan acetate, chitosan malate, chitosan citrate, chitosan formate, and others as may be recognized by a person of ordinary skill in the art in view of this disclosure. The cationic biopolymer may be provided in a concentration of 1-3% solutions of chitosan/chitosan derivative. The amount of the chitosan or chitosan derivative may exemplarily be based upon the turbidity measurement. In an exemplary embodiment, the dosage of chitosan when paired with natural media for selective or broad spectrum contaminant removal is directly proportionate to the turbidity (NTU) created by the addition of the natural media with the water. Heavier solids will require a higher concentration of the chitosan or chitosan derivative to coagulate and form flocs. It will be recognized that in embodiments, the antimicrobial properties of chitosan derivatives may be enhanced or mitigated or otherwise selected for or against depending upon a desired microbial load of the outgoing water from the treatment. In an exemplary embodiment, a stronger antimicrobial compound, for example chitosan acetate, may be used when microbial removal is desired. In other embodiments, a compound with a weaker antimicrobial effect, for example, chitosan malate, may be used if a higher output microbial count is desired, for example for a later aerobic or anaerobic digestion or yeast formation use.

It will be recognized that the chitosan/modified chitosan may further include one or more additives to modify or enhance the properties of the chitosan, including, but not limited to bentonite. The chitosan/modified chitosan coagulates the suspended solids/media at 112 to effectively separate the contaminants and contaminant laden media from the clean water. These coagulated flocs naturally sink to the bottom and the clean water stays on the upper layer of separation within the chamber 26. The clean water on the top layer can then be separated from the coagulate at 112 by draining the water from the top of the vessel or pumping the water from the top of the vessel to remove the water from the second chamber 26.

The coagulate may be removed from the bottom of the second chamber 26 for example by an auger 32 that operates to direct the coagulate into a collection receptacle 34 for gathering for disposal or reuse. Other forms of pumps, piping, scraping, screening, or paddles may be used to remove the coagulate. The separated water is filtered at 116 as a final process to remove any further contaminants or coagulate that inadvertently was pulled from the second chamber 26. The water may exemplarily be filtered using a the same filter media and biopolymer combination as used in the process above, screening, other mechanical filtration using ceramic or microfiber filters, carbon/activated carbon filtration, gravel, or sand. For example in the case of the treated water to be used for drinking/human consumption, then the further filtering may be used. In an exemplary embodiment, filter media of activated carbon powder, sand, and diatomaceous earth is added, mixed, coagulated and flocced with the chitosan or chitosan derivative in a final removal of harmful substances. The water may further be treated with UV light 38, for example UV light in the C wavelength band. This process results in purified treated water effluent 40.

EXAMPLES

In one scenario, water contaminated with phosphate mining tailings is treated. These mining tailings and/or other similar waste stream with high total suspended solids (TSS) can be initially treated with the chitosan or chitosan derivative. The suspended solids (colloids) are negatively charged which prevents the formation of larger masses (flocs), and prevents settling. Introduction of the chitosan or chitosan derivative, which exhibits a positive ionic charge, promotes a process of coagulation, flocculation, and settling. Gypsum and clay particles can be removed via flocculation/coagulation in this first stage. The water enters a second stage/tank that is configured to remove total dissolved solids (TDS) from the water. Depending upon the elements in the dissolved solids, a specific media type can be added and mixed into the water in order to retrieve the specific dissolved solids constituents. In this example, a phosphate and/or nitrate specific flocculant/coagulant combo media is introduced and mixed. Exemplarily the filter media is at least one of aragonite, pyrrhotite, and zeolite (or modified/impregnated zeolite). This filter media is specific to phosphate and attaches to dissolved phosphate in the water and coagulates, flocculates, separates, and can be removed by gravity separation, aeration/flotation, skimming/screening, lamella flow, etc. In a further embodiment, the chitosan or chitosan derivative may be added to the water at this stage as well to facilitate coagulation and removal of the media laden with trapped particles, including phosphate. As an added benefit, the coagulate results in media loaded with phosphate that, when paired, with aragonite makes a soil stabilizing growth boosting plant fuel.

In another scenario, eutrophic water supplies are loaded with nutrients such as phosphates and nitrates along with micro algae feeding off of the nutrients. Nutrient and algae laden water pose an environmental and personal health risk. Algae blooms are also a prime area for bacteria growth and disease carrying mosquitoes to reproduce. In an embodiment of treating this water, the water enters a tank/vessel where media specific to phosphates and nitrates is mixed into the nutrient and algae laden water. As noted above, such media may include, but are not limited to aragonite, pyrrhotite, and zeolite. After sufficient mixing, chitosan and/or chitosan derivatives are added into the contaminated water and mixed rapidly. The media (aragonite, diatomite, zeolite, etc.) attaches to the algae and microalgae, as well as the nitrates and phosphates in the water, then the chitosan solution coagulates the media and nutrients together. Here again, the media that is specific to phosphate/nitrate attaches to dissolved phosphate/nitrate in the water and coagulates, flocculates, separates, and can be removed by gravity separation, aeration/flotation, skimming/screening, lamella flow, etc.

In an embodiment, a filter media that includes one part aragonite, two parts bentonite, and one part zeolite may be used in the treatment of algae laden water. In such an embodiment, aragonite helps to bind to nitrate, phosphate, and algal biomass. The bentonite helps with settling and removal of biomass. The zeolite helps to remove phosphates, nitrates, and algal biomass.

In a further example of treatment of algae laden water, the high-algae water is pumped into a chamber/vessel where it is mixed with a blend of natural media to reduce suspended solids as well as media to selectively remove nitrates and phosphates. After the rapid mixing, chitosan and/or modified chitosan is added via a laminar flow pump, peristaltic pump, dosing meter, etc. to deliver the exact measured dose required to coagulate and separate the algae, phosphate, nitrates, and media from the water. As noted above, the doses of the chitosan or chitosan derivative or of any of the filter media may exemplarily be based upon the measured turbidity of the water. In a separate additional chamber/vessel the solids are removed and processed to in order to separate oil from the algae to be used as biofuel. Harmful cyanotoxins are removed during this stage using carbon, zeolite, calcium carbonate, etc. The remaining solids are comprised of algae biomass as well as nitrate and phosphate laden natural media. The media used in this stage of the process (example carbon-biochar, aragonite, zeolite, bentonite, etc.) are essential soil building supplements that (among many other benefits) prevent nutrient run off/algae blooms.

This exemplary process has the further benefit of sequestering algae, nitrates, and phosphates onto the selected filter media. This combination of the filter media, chitosan, and the removed substances can be utilized as fertilizer and soil enhancer. This may be applied to the soil, or as a coating directly onto seeds. When performed locally, this can reduces nutrient overload while improving the soil quality (which can decreases water requirements), and reduces nutrient run off which reduces harmful algae blooms.

In an exemplary embodiment as discussed above, wherein the sequestered algae, nirates, phosphates, and natural filter media are to be collected and used, then a further processing step or steps may be added. While an embodiment as described above may successfully remove VOC's, pesticides, pharmaceuticals, heavy metals, and/or radionuclides from the influent water, such contaminants would collect and concentrate in the sequestered algae, nitrates, phosphates, and natural filter media. If that collected substance is to be reused as a fertilizer or soil supplement, it is desirable to not have the VOC's, pesticides, pharmaceuticals, heavy metals, and/or radionuclides. Therefore, an initial process stage in which carbon powder, activated alumina, redox alloys, etc. can be added to the influent water. Those filter media may be removed by coagulation and separation, for example with the addition of the chitosan or chitosan derivatives. This removed these harmful contaminants prior to collection of contaminants with otherwise greater reuse opportunities/potential/value. This technique may be expanded beyond two stages as described above to include a "funnel" of stages to remove contaminants in an order of least valuable to most valuable. This results in the most valuable collected contaminants also being the most pure and free from other less valuable and/or more hazardous contaminants.

In embodiments, processes as described herein may be used in desalination of water and/or the treatment of brackish salinated water. Zeolite may be used in the geopolymer media in a fluid bed bioreactor treatment system. Chitosan biopolymer used in the biopolymer/geopolymer combination as described above, is also cationic which aids in the adsorption/Ion exchange and absorption of salts and minerals onto the geopolymer powder (for example bentonite, zeolite, aragonite, attapulgite, calcium, carbonate, etc.) In still further embodiments, bentonite or attapulgite clay or zeolite can be used to remove lithium salts from the treated water, while bentonite exemplarily is effective in phosphate adsorption.

In another embodiment, a unique natural pesticide can be provided using the concepts discussed above. In an embodiment, this natural pesticide includes chitosan, chitosan oligosaccharide, hydrogen peroxide, diatomite, hemp seed oil, bentonite, zeolite, and kelp/kelp extract. In one embodiment, it has been found that this pesticide mixture is particularly effective against citrus greening disease which is caused by a bacteria (Candidatus Liberibacter asiaticus) spread by insects, typically the Asian citrus psyllid, outbreaks of which have recently threatened citrus crops in Southeastern United States and elsewhere. It will be recognized that in other embodiments, more than or fewer than the constituent components listed above may be used, while remaining within the scope of the present disclosure.

Chitosan is non-water soluble, whereas chitosan oligosaccharide is water soluble. By combining the two substances, the plants can more readily absorb the chitosan and chitosan oligosaccharide while being protected by the non-water soluble form. This decreases the need for the plant tissue to produce chitosanase enzyme in order to break down the chitosan to be absorbed. The chitosan is a polymer (slightly viscous) that can coat the plant and not be washed away easily by rain, whereas the chitosan oligosaccharide can more easily be absorbed by the plant tissue and roots, therefore boosting immunity extra cellularly and intracellularly as well as exhibiting antimicrobial effects throughout the plant.

However, it has been found that chitosan acetate, formed by deacetylating chitin using acetic acid provides still further advantages over the use of chitosan alone. The chitosan acetate provides the anti-microbial effect of chitosan noted above, while providing the additional antimicrobial effects of acetic acid.

Other components of the pesticide mixture noted above further provide complementary advantages to the chitosan citrate and chitosan oligosaccharide noted above. Hydrogen Peroxide treats root rot, prevents root infections, and promotes root growth and disease resistance. The hydrogen peroxide further kills mold and mildew while aerating soil, all of which further enhance plant root health. Diatomite (diatomaceous earth) is a known effective insecticide effective against aphids, thrips, gnats, ants, mites, earwigs, adult flea beetles, cockroaches, snails, and slugs. The microscopic sharp edges of the diatomite damages cell lipid layers causing cells to dry out. Hemp seed oil exhibits further antimicrobial properties, killing bacteria, viruses, fungus, nematodes, mold, and mildew. Bentonite is a complementary additive to chitosan, the combination of which is known to kill gram positive and gram negative bacteria. Bentonite also helps plants to remain hydrated. Zeolites have high absorption capacities and high ion exchange capacities which make them effective carriers of fungicides and pesticides. Zeolites further provide soil amendment effects, helping soil to retain water, which improves nutrient retention in the soil by slowing the release of large cations such as ammonium and potassium uptake into plants. Kelp extract and/or seaweed extract further provides a source of minerals, vitamins and enzymes that are natural growth stimulants to plants which fuel plant cells to grow, producing stronger, healthier, and disease resistant plants. This also makes the plants more resistant to stress conditions such as drought or frost, increased resistance to pests, and increased yields. Kelp/seaweed extracts further contain alginates that are sponge like starches which hold water droplets near plants roots.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of water treatment comprising:
providing water comprising at least one contaminant;
adding a geopolymer filter media to the water;
agitating the water comprising at least one contaminant and the geopolymer filter media to form a homogeneous mixture;
adsorbing the at least one contaminant from the water onto the geopolymer filter media;
adding a cationic biopolymer to the homogeneous mixture of water and the filter media;
coagulating the geopolymer filter media and the at least one contaminant with the cationic biopolymer to form coagulated flocs; and
separating the water from the at least one contaminant and the geopolymer filter media by settling of the coagulated flocs;
wherein the at least one contaminant comprises algae and the geopolymer filter media comprises at least one of aragonite, pyrrhotite, diatomite, bentonite, and zeolite.

2. The method of claim 1, wherein the geopolymer filter media comprises at least aragonite, bentonite, and zeolite.

3. The method of claim 1, wherein the cationic biopolymer comprises chitosan or a chitosan derivative.

4. The method of claim 3, wherein the chitosan derivative is selected from chitosan citrate, chitosan oligosaccharide, chitosan acetate, chitosan malate, and chitosan formate.

5. The method of claim 3, wherein the cationic biopolymer comprises chitosan and at least one of: chitosan oligosaccharide, chitosan acetate, and chitosan citrate.

6. The method of claim 1, further comprising removing the water from the coagulated flocs.

7. The method of claim 3, wherein the cationic biopolymer comprising chitosan or a chitosan derivative is added as a solution having a concentration between 1-3% (m/v).

8. The method of claim 2, wherein the water is removed from the coagulated flocs during settling of the coagulated flocs.

9. The method of claim 2, further comprising:
filtering the water removed from the coagulated flocs; and
mechanically collecting the coagulated flocs.

10. The method of claim 1, wherein the geopolymer filter media comprises at least one additive selected from: carbon, calcium, perlite, activated alumina, redox alloys, attapulgite, and ion exchange resins.

11. The method of claim 1, wherein the geopolymer filter media comprises aragonite, bentonite, and zeolite in a ratio of one part aragonite, two parts bentonite, and one part zeolite.

12. The method of claim 1, wherein the cationic biopolymer comprises a combination of chitosan oligosaccharide with chitosan or chitosan acetate.

13. The method of claim 1, wherein the geopolymer filter media has an average particle size less than one millimeter.

14. The method of claim 13, wherein the geopolymer filter media has an average particle size less than 100 micrometers.

15. A method of water treatment comprising:
providing water comprising at least one contaminant;
adding a geopolymer filter media to the water;
agitating the water comprising at least one contaminant and the geopolymer filter media to form a homogeneous mixture;
adsorbing the at least one contaminant from the water onto the geopolymer filter media;
measuring a turbidity of the homogeneous mixture;
selecting a concentration of a cationic biopolymer comprising chitosan or a chitosan derivative based upon the measured turbidity wherein the concentration increases with increases in the turbidity;
adding the cationic biopolymer to the homogeneous mixture of water and the filter media;
coagulating the geopolymer filter media and the at least one contaminant with the cationic biopolymer to form coagulated flocs; and
separating the water from the at least one contaminant and the geopolymer filter media by settling of the coagulated flocs.

16. A method of water treatment comprising:
providing water comprising at least one contaminant;
adding a geopolymer filter media to the water;
agitating the water comprising at least one contaminant and the geopolymer filter media to form a homogeneous mixture;
adsorbing the at least one contaminant from the water onto the geopolymer filter media;
adding a cationic biopolymer to the homogeneous mixture of water and the filter media;
coagulating the geopolymer filter media and the at least one contaminant with the cationic biopolymer to form coagulated flocs; and
separating the water from the at least one contaminant and the geopolymer filter media by settling of the coagulated flocs;

wherein the geopolymer filter media comprises a geopolymer having an affinity for one or both of phosphate and nitrate.

17. The method of claim 16, wherein the geopolymer filter media comprises at least aragonite and zeolite.

18. The method of claim 17, wherein the geopolymer filter media further comprises at least one of bentonite and pyrrhotite.

19. A method of water treatment comprising:

providing water comprising at least one contaminant;

initially treating the water comprising at least one contaminant with chitosan or a chitosan derivative;

then adding a geopolymer filter media to the water;

agitating the water comprising at least one contaminant and the geopolymer filter media to form a homogeneous mixture;

adsorbing the at least one contaminant from the water onto the geopolymer filter media;

adding a cationic biopolymer to the homogeneous mixture of water and the filter media;

coagulating the geopolymer filter media and the at least one contaminant with the cationic biopolymer to form coagulated flocs;

separating the water from the at least one contaminant and the geopolymer filter media by settling of the coagulated flocs; and removing the water from the coagulated flocs.

20. The method of claim 1, A method of water treatment comprising:

providing water comprising at least one contaminant;

adding a geopolymer filter media to the water;

agitating the water comprising at least one contaminant and the geopolymer filter media to form a homogeneous mixture;

adsorbing the at least one contaminant from the water onto the geopolymer filter media;

adding a cationic biopolymer to the homogeneous mixture of water and the filter media;

coagulating the geopolymer filter media and the at least one contaminant with the cationic biopolymer to form coagulated flocs; and separating the water from the at least one contaminant and the geopolymer filter media by settling of the coagulated flocs;

wherein the geopolymer filter media comprises aragonite, bentonite, and zeolite in a ratio of one part aragonite, two parts bentonite, and one part zeolite.

21. The method of claim 20, further comprising removing the water from the coagulated flocs.

* * * * *